(12) United States Patent
Brdiczka et al.

(10) Patent No.: US 8,762,375 B2
(45) Date of Patent: Jun. 24, 2014

(54) METHOD FOR CALCULATING ENTITY SIMILARITIES

(75) Inventors: Oliver Brdiczka, Mountain View, CA (US); Petro Hizalev, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 637 days.

(21) Appl. No.: 12/760,949

(22) Filed: Apr. 15, 2010

(65) Prior Publication Data

US 2011/0258193 A1 Oct. 20, 2011

(51) Int. Cl.
*G06F 17/30* (2006.01)

(52) U.S. Cl.
USPC .......................................... 707/736; 707/737

(58) Field of Classification Search
USPC .................................. 707/736, 737
See application file for complete search history.

(56) References Cited

U.S. PATENT DOCUMENTS

| | | | |
|---|---|---|---|
| 8,290,962 B1 * | 10/2012 | Chu ............................. | 707/749 |
| 8,392,443 B1 * | 3/2013 | Allon et al. .................... | 707/765 |
| 2003/0182310 A1 * | 9/2003 | Charnock et al. .......... | 707/104.1 |
| 2005/0210006 A1 * | 9/2005 | Robertson et al. ................ | 707/3 |
| 2006/0167930 A1 * | 7/2006 | Witwer et al. ................ | 707/102 |
| 2007/0156732 A1 | 7/2007 | Surendran | |
| 2009/0070325 A1 * | 3/2009 | Gabriel et al. .................... | 707/5 |
| 2009/0106375 A1 | 4/2009 | Carmel | |
| 2011/0060796 A1 * | 3/2011 | Grigsby et al. ............... | 709/206 |
| 2011/0246181 A1 * | 10/2011 | Liang et al. ........................ | 704/9 |

FOREIGN PATENT DOCUMENTS

WO 2009052277 A1 4/2009

OTHER PUBLICATIONS

Stefan Evert: "The Statistics of Word Cooccurrences Word Pairs and Collocations", Jan. 1, 2005, XP55002453, pp. 15-21, 23, 24-27.
Salton G. et al., "Term-Weighting Approaches in Automatic Text Retrieval", Information Processing & Management, Elsevier, Barking, GB, vol. 24, No. 5, Jan. 1, 1988, pp. 513-523.
Elie Sanchez: "Fuzzy Logic and the Semantic Web", Jan. 1, 2006, pp. 285-288.
Gerard Salton, et al., "Introduction to Modern Information Retrieval", 1983, McGraw-Hill Book Company, New York, NY, pp. 201-215.
David Nadeau et al., "A Survey of Named Entity Recognition and Classification", Internet Citation, 2007, pp. 1-20.
Tru H Cao et al., "Fuzzy Named Entity-Based Document Clustering", Fuzzy Systems, 2008, pp. 2028-2034.
Manco G et al., "A framework for adaptive mail classification", Proceedings of the 14th IEEE international Conference on Tools with Artificial Intelligence, Nov. 4, 2002, pp. 387-392.

* cited by examiner

*Primary Examiner* — Apu Mofiz
*Assistant Examiner* — Fariborz Khoshnoodi
(74) *Attorney, Agent, or Firm* — Shun Yao; Park, Vaughan, Fleming & Dowler LLP

(57) ABSTRACT

One embodiment of the present invention provides a system for estimating a similarity level between semantic entities. During operation, the system selects two or more semantic entities associated with a number documents. The system subsequently parses the documents into sub-parts, and calculates the similarity level between the semantic entities based on occurrences of the semantic entities within the sub-parts of the documents.

22 Claims, 5 Drawing Sheets

METHOD FOR CALCULATING ENTITY SIMILARITIES

RELATED APPLICATION

The subject matter of this application is related to the subject matter in a co-pending non-provisional application by the same inventors as the instant application and filed on the same day as the instant application entitled "METHOD FOR CALCULATING SEMANTIC SIMILARITIES BETWEEN MESSAGES AND CONVERSATIONS BASED ON ENHANCED ENTITY EXTRACTION," having Ser. No. 12/760,900, and filed on 15 Apr. 2010.

BACKGROUND

1. Field

This disclosure is generally related to content analysis. More specifically, this disclosure is related to calculating similarities between semantic entities.

2. Related Art

The proliferation of electronic mails (emails) has greatly impacted people's everyday life, especially their working life. Modern workers spend, on average, one to two hours of their workday on emails: reading, ordering, sorting, and writing. It is very common for an email user to receive tens, even hundreds, of emails every day. Many of the emails carry important information that may need to be retrieved at a later time. However, the cluttered email inbox of a user often makes retrieving such information difficult.

To help email users better organize their email messages, various email applications have provided different solutions. For example, users of Outlook® (registered trademark of Microsoft Corporation of Redmond, Wash.) can apply various rules to incoming emails in order to sort them into different folders. In addition, Outlook® can aggregate email messages into conversations by matching subject lines or senders/recipients. Note that an email conversation is a set of related messages generated by the "reply" operation. Gmail™ (trademark of Google Inc. of Mountain View, Calif.) allows its users to apply labels to messages in order to categorize the messages accordingly. Hence, a user can place all emails related to a task within a single folder, or apply a single label to these emails. As a result, if the user ever needs to retrieve information related to a task, he can go to the corresponding folder or click on the corresponding label. However, these approaches require manual input from the user, which can be cumbersome and time-consuming. In addition, in scenarios where no explicit rule or label can be applied to a message, or where the sender of a message does not use the reply function, the user may find it difficult to retrieve related messages.

SUMMARY

One embodiment of the present invention provides a system for estimating a similarity level between semantic entities. During operation, the system selects two or more semantic entities associated with a number documents. The system subsequently parses the documents into sub-parts, and calculates the similarity level between the semantic entities based on occurrences of the semantic entities within the sub-parts of the documents.

In a variation on this embodiment, the sub-parts of the documents include individual sentences and/or individual paragraphs.

In a further variation, calculating the similarity level involves determining sentence-based and/or paragraph-based co-occurrence frequencies of the semantic entities.

In a further variation, the sentence-based co-occurrence frequency of the semantic entities is calculated based on a total number of sentences within which the semantic entities co-occur, and the paragraph-based co-occurrence frequency of the semantic entities is calculated based on a total number of paragraphs within which the semantic entities co-occur.

In a further variation, calculating the similarity level of a first semantic entity in relation to a second semantic entity involves calculating a ratio of a co-occurrence frequency of the first and second semantic entities to an occurrence frequency of the second semantic entity.

In a further variation, calculating the similarity level of a first semantic entity in relation to a second semantic entity further involves calculating a ratio of a weighted inverse-document-frequency (IDF) value of the second semantic entity to a weighted IDF value of the first semantic entity.

In a variation on this embodiment, the documents include an email message and/or an email conversation.

In a further variation, the semantic entities include names of people, and calculating the similarity level between the names of people involves determining a co-occurrence frequency of the names of people within sender and/or recipient lists of the email message.

In a variation on this embodiment, the semantic entities include at least one of: people's names, companies' names, industry-specific terms, dates and times, street addresses, email addresses, uniform resource locators (URLs), and telephone numbers.

In a variation on this embodiment, calculating the similarity level involves determining a weight function for at least one document.

BRIEF DESCRIPTION OF THE FIGURES

In the figures, like reference numerals refer to the same figure elements.

DETAILED DESCRIPTION

Figure 1:
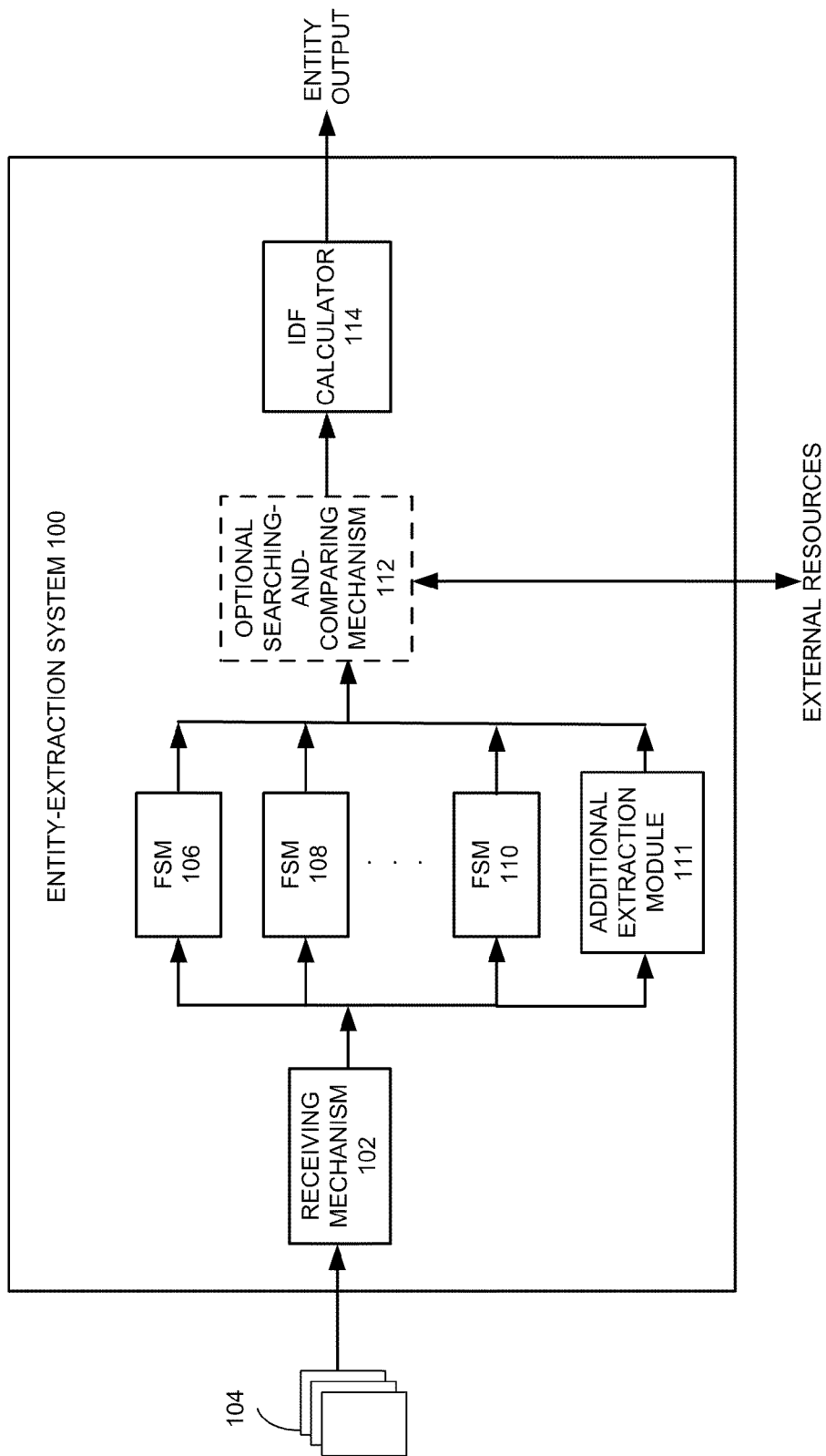
FIG. 1 presents a diagram illustrating an entity-extraction system in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for identifying similarities between semantic entities within documents. During operation, the system selects semantic entities from a collection of documents, and calculates similarities between the semantic entities based on the occurrence and co-occurrence frequencies of the semantic entities within sentences and/or paragraphs of the documents. For semantic entities related to people's names, the system further determines their co-occurrence frequency within the sender and/or recipient lists of email messages in order to estimate their similarity.

Extracting Semantic Entities

In order to help email users organize their saved email messages efficiently, or present messages to users in a way that has a better local context, various solutions have been implemented, including grouping emails based on conversations to which they belong. An email conversation is established when email users correspond back-and-forth to each other, similarly to having a real-life conversation. Most often, when users are discussing a related topic, they reply to each other's emails, as if they were having a real-life conversation. However, conversation-based grouping can be insufficient, especially in cases where several different conversations are taking place regarding a related matter. For example, a task organizer may have different task-related conversations with different task members. These conversations, or emails within the conversations, often share a similar topic or are related to the same task, and it is desirable to group them together for display.

Because these conversations and messages are related, they often share similar words or combinations of words. For example, conversations discussing local weather may all include words like rain, snow, or wind. Hence, by comparing the text, one can estimate the similarity between two messages.

Conventional similarity calculations between documents typically rely on matching the text of the concerned documents by counting and comparing occurrences of words. However, such an approach can be inefficient and may generate false results. For example, for emails containing boilerplate text, the co-occurrence of the boilerplate text may be high between two messages, whereas the similarity between the two messages may actually be low. To overcome such an issue, in one embodiment of the present invention, instead of counting the occurrences of each word, the system relies on the comparison of the occurrences of meaningful words that are defined as "entities" in order to derive similarities between messages or conversations.

FIG. 1 presents a diagram illustrating an entity-extraction system in accordance with an embodiment of the present invention. Entity-extraction system 100 includes a receiving mechanism 102, a number of finite state machines (FSMs) 106-110, an optional searching-and-comparing mechanism 112, and an IDF calculator 114.

During operation, receiving mechanism 102 receives input documents 104 for entity extraction. Input documents 104 can be any type of document that contains text, symbols, figures, and/or any combination thereof. Input documents 104 can also be any type of file format, such as plain text, Microsoft® Word (registered trademark of Microsoft Corporation of Redmond, Wash.), Hyper Text Markup Language (HTML), Portable Document Format (PDF), etc. In one embodiment, input documents 104 include email messages.

Input documents 104 can also include all documents contained in a corpus. For example, input documents 104 can include all messages in a user's email folders.

The text of the received documents is then sent to a number of FSMs, including FSMs 106-110. These FSMs have been designed differently to recognize semantic entities belonging to different predefined groups. Semantic entities can be words, word combinations, or sequences having specific meanings. A word or a sequence of words can be a semantic entity if it belongs to a specific word group, such as people's names, companies' names, dates and times, street addresses, industry-specific terms, email addresses, uniform resource locators (URLs), and phone numbers. FSMs 106-110 are able to recognize words of these specific groups in the text of the received documents while taking into account sentence and word structure. Standard annotation and parsing techniques can be used in order to recognize semantic entities. In one embodiment, FSMs 106-110 are configured to recognize semantic entities belonging to the aforementioned word groups. Furthermore, in cases in which a semantic entity does not belong to any of the specified groups or cannot be found in any dictionary, FSMs 106-110 can also be configured to recognize such a new entity based on its capitalization practices or other criteria that identify the new entity. In one embodiment, this additional semantic-entity-extraction function can be performed by an additional extraction module 111. If a word or a sequence of words in the received documents is consistently capitalized, either always or with a high percentage of all occurrences, it can be recognized as a semantic entity. For example, user-defined acronyms often do not belong to any specified group or cannot be found in any dictionary; however, they are meaningful semantic entities.

In addition to English, FSMs 106-110 can also be designed to recognize semantic entities in other languages. To achieve better extraction results, users can configure FSMs 106-110 based on types of received documents, including language type or content type. Note that in FIG. 1, FSMs 106-110 are implemented in a parallel fashion in which text is processed by these FSMs simultaneously; however, it is also possible to implement FSMs 106-110 serially. In addition to applying FSMs, other techniques, such as machine learning, are also possible for recognizing semantic entities in received documents.

To avoid meaningless words being incorrectly recognized by FSMs 106-110 as semantic entities, certain types of the identified entities from the text of the received documents are sent to optional searching-and-comparing mechanism 112 to be searched and compared with external resources. Note that because the searching-and-comparing operation does not apply to all entity types, this operation is optional. In one embodiment, the external resources include web resources, such as Wikipedia® (registered trademark of the Wikimedia Foundation Inc. of San Francisco, Calif.), and online dictionaries. In one embodiment, the external resources can also include an entity database. Standard web-searching or database-searching methods can be performed by optional searching-and-comparing mechanism 112. The output of optional searching-and-comparing mechanism 112 is a number of entity candidates to be considered for extraction.

Subsequently, the entity candidates are sent to IDF calculator 114, which calculates their IDF values. The IDF value of an entity candidate e is defined as:

$$idf_e = \log \frac{|T|}{|T_e|},$$

where |T| is the total number of documents (or email messages), and |T$_e$| is the number of documents (or email messages) where the entity candidate e has been observed. The IDF value can be used to measure the significance of an entity candidate. A low IDF value often indicates that the entity candidate is broadly used across the corpus, thus being likely to be a boilerplate, a statistic outlier, or a wrong detection. In contrast, a high IDF value indicates that such an entity candidate is truly a meaningful or significant semantic entity and deserves to be extracted from the document. In one embodiment, entity candidates with IDF values within a predetermined range of values are extracted, whereas entity candidates with IDF values outside this range are ignored. In a further embodiment, the user is allowed to adjust the extraction range and corresponding thresholds based on his knowledge regarding the extracted entities.

Figure 2:
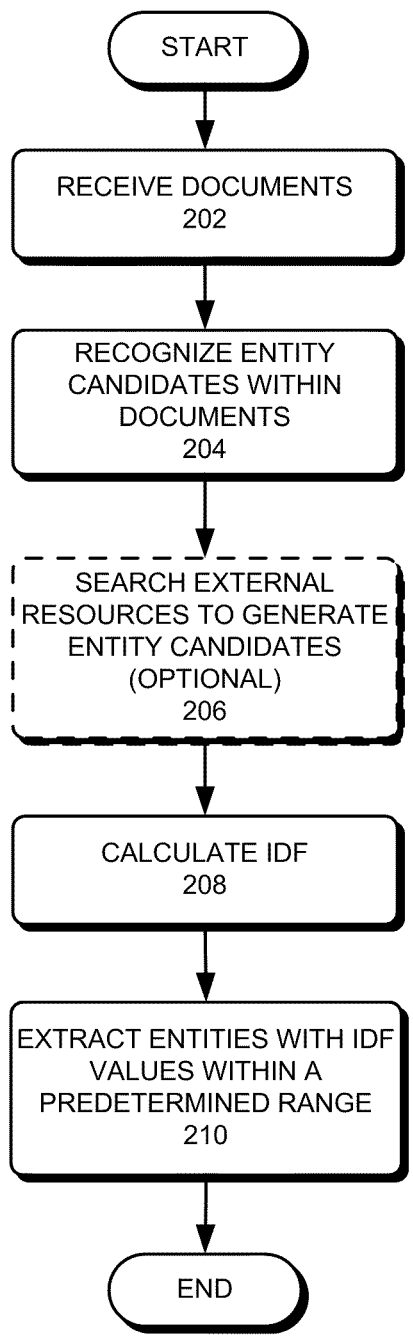
FIG. 2 presents a flowchart illustrating the process of extracting entities in accordance with an embodiment of the present invention.

FIG. 2 presents a flowchart illustrating the process of extracting entities in accordance with an embodiment of the present invention. During operation, the system receives all documents from a predefined corpus (operation 202). In one embodiment, the predefined corpus includes all documents from a user's email folders. The system then recognizes semantic entities within the documents (operation 204). In one embodiment, the system uses a number of FSMs for the detection of semantic entities. The system can then optionally search one or more external resources in order to compare detected semantic entities with known entities in the external resources (operation 206). The semantic entities with positive search results are considered entity candidates. Subsequently, the system calculates IDF values for entity candidates (operation 208). Entity candidates with IDF values within a predetermined range are extracted as meaningful semantic entities (operation 210).

Entity Similarities

The extracted semantic entities, which are considered significant entities, can then be used for similarity calculations between messages. In addition to calculating message similarities, the system can also calculate similarities between extracted entities. Two entities, such as the names of two people, can be highly correlated, thus having a high similarity value. For example, a task manager may find the names of his task members share a high similarity. Or a product manager may find the names of two related products share a high similarity. Being able to calculate entity similarities makes it possible to identify similar or related entities, thus facilitating the user's understanding of the context of received email messages.

Entity-to-entity similarity is derived from the occurrence and the co-occurrence of the entities in messages or subparts, such as sentences and paragraphs, of messages. The sentence-based occurrence of an entity is defined as the number of sentences in which the entity occurs, and the sentence-based co-occurrence of two entities is defined as the number of sentences in which the two entities co-occur. Similarly, the paragraph-based occurrence of an entity is defined as the number of paragraphs in which the entity occurs, and the paragraph-based co-occurrence of two entities is defined as the number of paragraphs in which the two entities co-occur. Note that the occurrence and co-occurrence of entities are counted over an entire corpus. In one embodiment, the corpus includes an entire email conversation. In one embodiment, the corpus includes all email messages in a user's email folders.

In addition to sentence- or paragraph-based occurrence and co-occurrence, the entity-to-entity similarity also depends on the IDF values of the entities. In one embodiment, the entity IDF values are modified by respective entity weight. Entities belonging to different groups are assigned different weights. For example, entities belonging to the group of people's names are assigned a different weight from entities belonging to the group of street addresses. Depending on the importance of the different entity groups and the context of the corpus, the weights can be adjusted accordingly. For example, for a human-resources worker, people's names carry more weight than technical terms, whereas the opposite can be true for an engineer. In one embodiment, the entity weights are user-configurable.

The sentence-based similarity of entity b toward entity a can be calculated as:

$$sim_{sentence}(a, b) = \frac{idf_a \cdot w_a}{idf_b \cdot w_b} \cdot \frac{co_{sentence}(a, b)}{occ_{sentence}(a)}, \quad (1)$$

where $idf_a$ and $idf_b$ are IDF values of entities a and b, respectively; $w_a$ and $w_b$ are weight functions of entities a and b, respectively; $co_{sentence}(a,b)$ represents the sentence-based co-occurrence of entities a and b, and $occ_{sentence}(a)$ is the sentence-based occurrence of entity a. In one embodiment, the entity IDF values are calculated over the entire conversation. In a further embodiment, the entity IDF values are calculated over all email messages. Note that the entity-to-entity similarity is directional, that is, the a-to-b similarity is different from the b-to-a similarity.

The paragraph-based similarity of entity b toward a can be calculated as:

$$sim_{paragraph}(a, b) = \frac{idf_a \cdot w_a}{idf_b \cdot w_b} \cdot \frac{co_{paragraph}(a, b)}{occ_{paragraph}(a)}, \quad (2)$$

where $idf_a$ and $idf_b$ are IDF values of entities a and b, respectively; $w_a$ and $w_b$ are weight functions of entities a and b, respectively; $co_{paragraph}(a,b)$ represents the paragraph-based co-occurrence of entities a and b, and $occ_{paragraph}(a)$ is the paragraph-based occurrence of entity a.

In one embodiment, the system takes into account the co-occurrence of entities in both sentences and paragraphs. To do so, the system can combine the sentence-based similarity and the paragraph-based similarity in order to deduct a combined entity-to-entity similarity. The combined entity-to-entity similarity can be calculated as:

$$sim_{combined}(a,b) = \alpha_{sentence} \cdot sim_{sentence}(a,b) + 4(1-\alpha_{sentence}) \cdot sim_{paragraph}(a,b), \quad (3)$$

where $\alpha_{sentence}$ specifies the weight of the sentence-based similarity compared with the paragraph-based similarity, and is assigned a value between 0 and 1. Because the sentence-based co-occurrence of entities often plays a more important role than that of the paragraph-based one, $\alpha_{sentence}$ is often assigned a value that is close to 1. In one embodiment, the value of $\alpha_{sentence}$ can be user-configurable.

Not all messages are considered to be equally important to the user. Hence, when calculating the entity-to-entity similarity, one should take into account the level of importance of the messages. In other words, different email messages have different weights, and when calculating entity occurrence or co-occurrence, the system modifies the number of occurrences based on the message weight. For example, the occurrence of an entity in a more important email contributes more toward the total occurrence of the entity than its occurrence in a less important email.

A number of factors can influence the weight of a message. These factors include, but are not limited to: message type, information associated with senders and recipients, timing information, and entity density. Message type indicates whether the message is a request for information/action, a status upstate, a scheduling request, a reminder, or a social message. Different types of messages exhibit different importance to the user. For example, in a work environment, social messages are more likely to be less important than a message for scheduling a meeting. The importance of an email can also be inversely correlated with the number of recipients of the email. In other words, emails with vast numbers of recipients are less important.

Other information associated with senders and recipients of an email can also be used to gauge its importance to the user. For example, the system can determine how often emails are exchanged between the user and certain senders, and how balanced the exchange is. By doing so, the system can identify email senders of mailing lists, and use such information to adapt or reduce the importance of messages sent by such senders. In addition, the system can examine the "TO" field in an email message to determine whether the user is a direct recipient of the message. If so, the message can be given a higher weight. The system can also determine whether a message is a direct reply to one of the user's sent messages. If so, the message is given a higher weight.

The age of an email also plays a role in determining its importance. In general, older emails (emails that were sent or received a long time ago) are less important to the user. Moreover, the number of extracted entities or the entity density within an email can also be used to measure its importance. Such entity density often corresponds to the information content and density of a message. Hence, a more informative message that includes a larger number of extracted entities can be viewed as more important to the user.

These different factors influencing message weight are mapped to values between 0.0 and 1.0, either using a rule-based approach (when information associated with senders and recipients is used for gauging importance) or a direct mapping function (when the number of recipients is used to calculate message weight). The final message weight is a weighted sum of the individual factor values. For a message j, the total weight of the message is given by:

$$w_{total,j} = \sum_i \alpha_i w_{i,j}$$

where $w_{i,j}$ represents the value of a factor i for message j, and $\alpha_i$ represents the weight of the factor i. Note that $$\sum_i \alpha_i = 1.$$

In order to take into account message weight for entity-to-entity similarity calculation, the message weight is propagated to sentences and paragraphs. Hence, the weight of a sentence s can be calculated as: $w_{total,s} = w_{total,m} \forall s \in m$, where m refers to message m, and $w_{total,m}$ is the total weight of message m. Similarly, the weight of a paragraph p can be calculated as: $w_{total,p} = w_{total,m} \forall p \in m$.

Consequently, the sentence-based occurrence of entity a and co-occurrence of entities a and b can be calculated as:

$$occ_{sentence}(a) = \sum_{s \in \{sentences | a \in sentences\}} w_{totals,s}, \text{ and}$$

$$co_{sentence}(a, b) = \sum_{s \in \{sentences | a, b \in sentences\}},$$

respectively. Similarly, the paragraph-based occurrence of entity a and co-occurrence of entities a and b can be calculated as:

$$occ_{paragraph}(a) = \sum_{p \in \{paragraphs | a \in paragraphs\}} w_{total,p}, \text{ and}$$

$$co_{paragraph}(a, b) = \sum_{p \in \{paragraphs | a, b \in paragraphs\}} w_{total,p},$$

respectively.

The entity-to-entity similarity can further be enhanced for entities belonging to specific groups. More specifically, person entities (such as people's names) can be matched to email recipients and senders. For example, if two names are often seen together in email recipient list, it is very likely that these two names have a high similarity. Similarly, if the system can determine that two names are often seen together participating in email conversations (as either senders or recipients), the system can determine that these two names have a high similarity.

The calculation of the email-participants-based similarity is similar to the calculation of the sentence-based similarity, except that the occurrence and co-occurrence of entities are now based on their appearance in the sender/recipient lists of email messages. The email-participants-based similarity and the previously calculated similarity, which combines sentence-based and paragraph-based similarities, can be fused together to get a final similarity calculation for person-entities. The final similarity for person-entity-to-person-entity can be calculated as:

$$sim_{person-entity}(a, b) = \alpha_{email-participants} \cdot sim_{email-participants}(a, b) + \qquad (4)$$
$$(1 - \alpha_{email-participants}) \cdot sim_{combined}(a, b),$$

where $sim_{email-participants}$ represents the entity-to-entity similarity based on occurrence/co-occurrence of email participants, $\alpha_{email-participants}$ specifies the weight of the email-participants-based similarity compared to the combined (sentence- and paragraph-based) similarity, and $\alpha_{email-participants}$ is assigned a value between 0 and 1. In one embodiment, the system gives more weight to the email-participants-based similarity, and $\alpha_{email-participants}$ is given a value that is larger than 0.6. Note that, when calculating the email-participants-based similarity, one can also take into account the weight of individual email messages.

Figure 3:
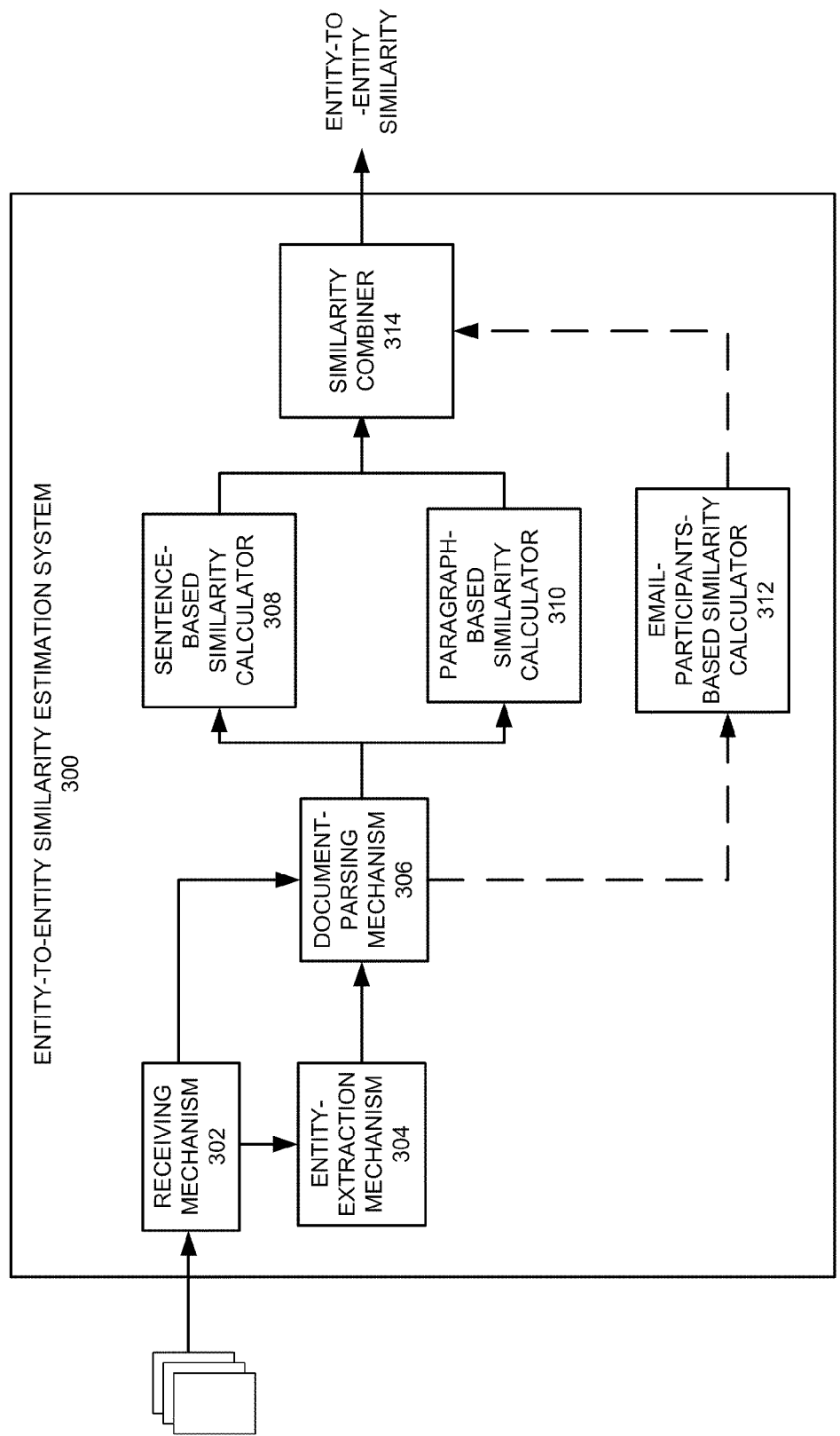
FIG. 3 presents a diagram illustrating an exemplary system for estimating entity-to-entity similarity in accordance with an embodiment of the present invention.

FIG. 3 presents a diagram illustrating an exemplary system for estimating entity-to-entity similarity in accordance with an embodiment of the present invention. Entity-to-entity similarity estimation system 300 includes a receiving mechanism 302, an entity-extraction mechanism 304, a document-parsing mechanism 306, a sentence-based similarity calculator 308, a paragraph-based similarity calculator 310, an email-participants-based similarity calculator 312, and a similarity combiner 314.

During operation, receiving mechanism 302 receives a number of documents from a corpus, which can be the content of a user's email folders, and where the documents are email messages. The received documents are sent to entity-extraction mechanism 304 for extraction of the meaningful semantic entities. Detailed structure of entity-extraction mechanism 304 is shown in FIG. 1. Note that the IDF values of the extracted entities have been calculated during the entity-extraction process.

Document-parsing mechanism 306 parses the received documents into sub-parts, such as sentences and paragraphs. If the received documents are email messages, the document sub-parts include the sender/recipient lists. Sentence-based similarity calculator 308 calculates sentence-based entity-to-entity similarity based on the co-occurrence of entities within sentences. Similarly, paragraph-based similarity calculator 310 calculates paragraph-based entity-to-entity similarity based on the co-occurrence of entities within paragraphs. If the received documents are email messages, and the entities to be considered are person-entities, such as people's names, these names are also sent to email-participants-based similarity calculator 312 for the calculation of the email-participants-based similarity. The outputs of all similarity calculators 308-314 are then sent to similarity combiner 314 to calculate the final similarity. In one embodiment, different weight functions are assigned to the different types of similarities before they are combined.

Figure 4:
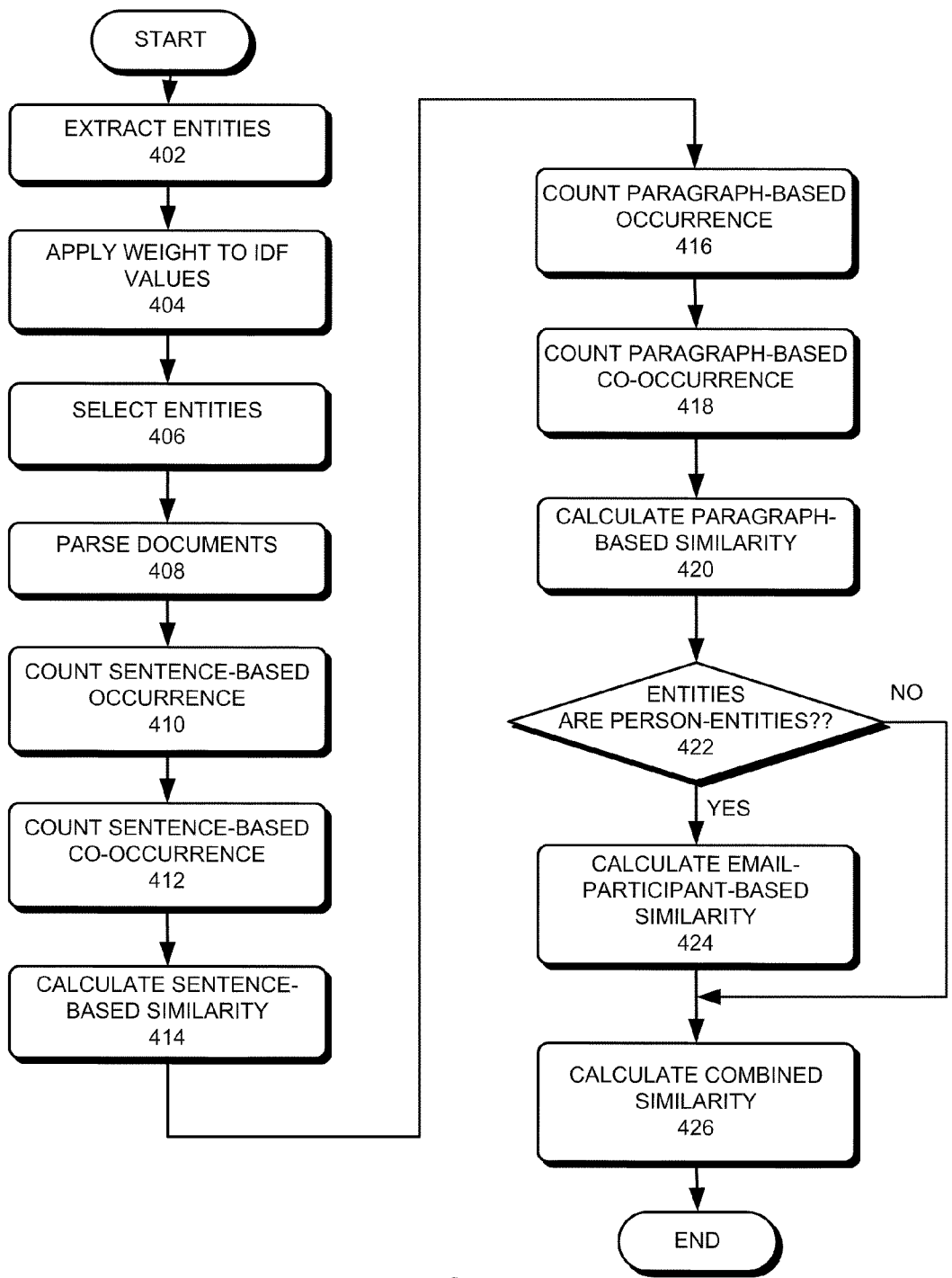
FIG. 4 presents a flowchart illustrating the process of estimating entity-to-entity similarity in accordance with an embodiment of the present invention.

FIG. 4 presents a flowchart illustrating the process of estimating entity-to-entity similarity in accordance with an embodiment of the present invention. During operation, the system extracts meaningful semantic entities from documents within a corpus, such as a user's emails (operation 402), and applies a weight to the IDF value of each entity based on the groups it belongs to (operation 404). In one embodiment, possible groups include, but are not limited to: people's names, companies' names, dates and times, street addresses, industry-specific terms, email addresses, uniform resource locators (URLs), and phone numbers. The entity-extraction process is similar to that shown in FIG. 2.

The system then selects a given entity and a different entity (operation 406). Note that the subsequent entity-to-entity similarity calculation calculates the similarity of the different entity toward the given entity. The system parses the documents into sentences and paragraphs (operation 408). Subsequently, the system counts the number of sentences in which the given entity appears (operation 410), the number of sentences in which the given entity and the other entity appear together (operation 412), and calculates the sentence-based similarity (operation 414). In addition, the system counts the number of paragraphs in which the given entity appears (operation 416), the number of paragraphs in which the given entity and the other entity appear together (operation 418), and calculates the paragraph-based similarity (operation 420).

The system then determines whether both entities are person-entities (operation 422). If so, the system further calculates the email-participants-based similarity (operation 424). In one embodiment, all similarity calculations take into account document/message weights. Afterwards, the system combines all calculated similarities based on their respective weights to calculate the combined entity-to-entity similarity (operation 426).

Exemplary Computer System

Figure 5:
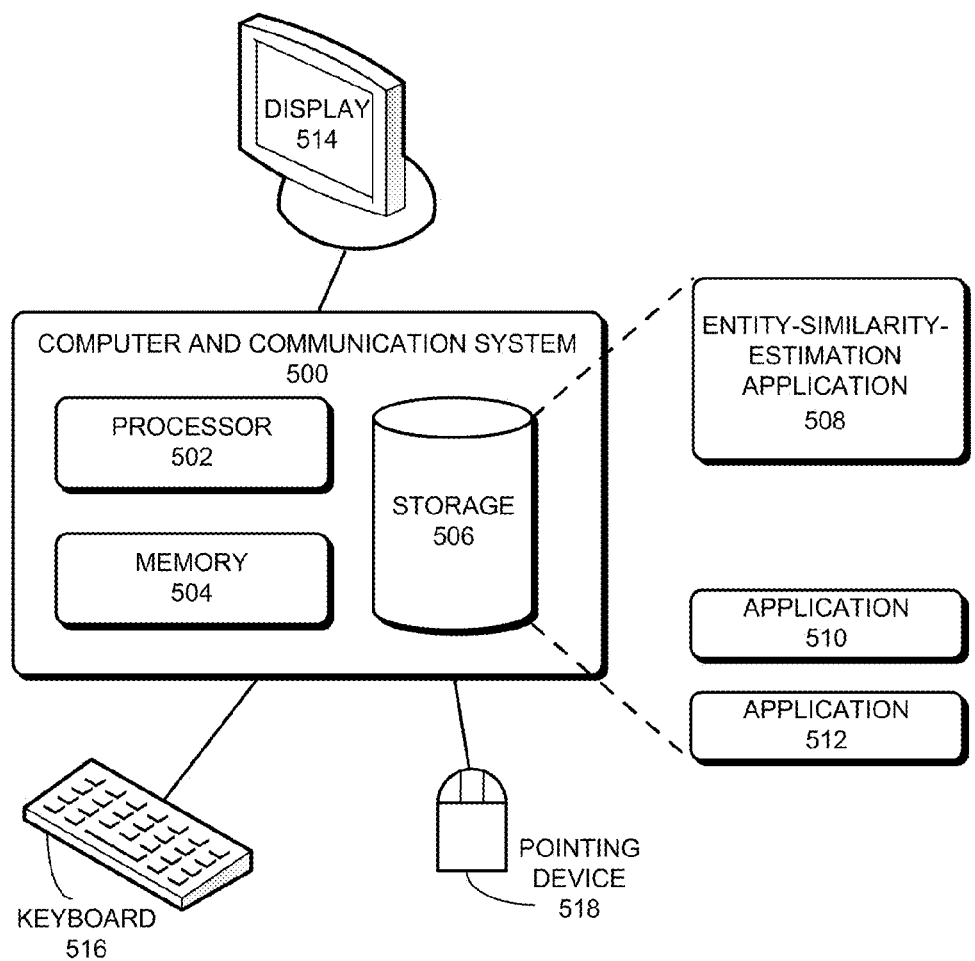
FIG. 5 illustrates an exemplary computer system for entity-similarity estimation in accordance with one embodiment of the present invention.

FIG. 5 illustrates an exemplary computer system for entity-similarity estimation in accordance with one embodiment of the present invention. In one embodiment, a computer and communication system 500 includes a processor 502, a memory 504, and a storage device 506. Storage device 506 stores an entity-similarity-estimation application 508, as well as other applications, such as applications 510 and 512. During operation, entity-similarity-estimation application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for estimating a similarity level between semantic entities, the method comprising:
   extracting, by a computing device, two or more semantic entities from a set of documents, wherein a semantic entity includes a meaningful character sequence;
   parsing a respective document to partition the respective document into a plurality of sub-parts; and
   calculating the similarity level between a first extracted semantic entity and a second extracted entity based on a co-occurrence of the first and second entities in the plurality of document sub-parts, wherein calculating the similarity level involves calculating:

$$sim_{subpart}(\text{first\_entity}, \text{second\_entity}) = \frac{idf_{first\_entity}}{idf_{second\_entity}} \cdot \frac{co_{subpart}(\text{first\_entity}, \text{second\_entity})}{occ_{subpart}(\text{first\_entity})},$$

wherein idf$_{first\_entity}$ and idf$_{second\_entity}$ are inverse-document-frequency (IDF) values of the first and second entities, respectively, wherein co$_{subpart}$ (first_entity, second_entity) indicates a number of document subparts within which the first and second entities co-occur, and wherein occ$_{subpart}$(first_entity) indicates a number of document subparts within which the first entity occurs.

2. The method of claim 1, wherein a respective document subpart includes an individual sentence and/or an individual paragraph.

3. The method of claim 2, wherein calculating the similarity level involves determining sentence-based and/or paragraph-based co-occurrence frequencies of the semantic entities.

4. The method of claim 3, wherein the sentence-based co-occurrence frequency of the semantic entities is calculated based on a total number of sentences within which the semantic entities co-occur, and wherein the paragraph-based co-occurrence frequency of the semantic entities is calculated based on a total number of paragraphs within which the semantic entities co-occur.

5. The method of claim 3, further comprising calculating weighted IDF values of the first and second entities.

6. The method of claim 1, wherein the documents include an email message and/or an email conversation.

7. The method of claim 6, wherein the semantic entities include names of people, and wherein calculating the similarity level between the names of people involves determining a co-occurrence frequency of the names of people within sender and/or recipient lists of the email message.

8. The method of claim 1, wherein the semantic entities include at least one of:
people's names;
companies' names;
industry-specific terms;
dates and times;
street addresses;
email addresses;
uniform resource locators (URLs); and
telephone numbers.

9. The method of claim 1, wherein calculating the similarity level involves determining a weight function for at least one document.

10. A non-transitory computer-readable storage medium storing instructions that when executed by a computer cause the computer to perform a method for estimating a similarity level between semantic entities, the method comprising:
extracting two or more semantic entities from a set of documents;
parsing a respective document to partition the respective document into a plurality of sub-parts; and
calculating the similarity level between a first extracted semantic entity and a second extracted entity based on a co-occurrence of the first and second entities in the plurality of document sub-parts, wherein calculating the similarity level involves calculating:

$$sim_{subpart}(\text{first\_entity, second\_entitiy}) = \frac{idf_{first\_entity}}{idf_{second\_entity}} \cdot \frac{co_{subpart}(\text{first\_entity, second\_entity})}{occ_{subpart}(\text{first\_entity})},$$

wherein idf$_{first\_entity}$ and idf$_{second\_entity}$ are inverse-document-frequency (IDF) values of the first and second entities, respectively, wherein co$_{subpart}$ (first_entity, second_entity) indicates a number of document subparts within which the first and second entities co-occur, and wherein occ$_{subpart}$ (first_entity) indicates a number of document subparts within which the first entity occurs.

11. The computer-readable storage medium of claim 10, wherein a respective document subpart includes an individual sentence and/or an individual paragraph.

12. The computer-readable storage medium of claim 11, wherein calculating the similarity level involves determining sentence-based and/or paragraph-based co-occurrence frequencies of the semantic entities.

13. The computer-readable storage medium of claim 12, wherein calculating the similarity level of a first semantic entity in relation to a second semantic entity involves calculating a ratio of a co-occurrence frequency of the first and second semantic entities to an occurrence frequency of the second semantic entity.

14. The computer-readable storage medium of claim 12, wherein the method further comprises calculating weighted IDF values of the first and second entities.

15. The computer-readable storage medium of claim 10, wherein the documents include an email message and/or an email conversation.

16. The computer-readable storage medium of claim 15, wherein the semantic entities include names of people, and wherein calculating the similarity level between the names of people involves determining a co-occurrence of the names of people within sender and/or recipient lists of the email message.

17. The computer-readable storage medium of claim 10, wherein the semantic entities include at least one of:
people's names;
companies' names;
industry-specific terms;
dates and times;
street addresses;
email addresses;
uniform resource locators (URLs); and
telephone numbers.

18. The computer-readable storage medium of claim 10, wherein calculating the similarity level involves determining a weight function for at least one document.

19. A system for estimating a similarity level between semantic entities, comprising:
a processor;
a memory;
an extracting mechanism configured to extract two or more semantic entities associated with a set of documents;
a parsing mechanism configured to parse a respective document to partition the respective document into a plurality of sub-parts; and
an entity-similarity-calculation mechanism configured to calculate the similarity level between a first extracted semantic entity and a second extracted entity based on a co-occurrence of the first and second entities in the plurality of document sub-parts, wherein while calculating the similarity level, the entity-similarity-calculation mechanism is configured to calculate:

$$sim_{subpart}(\text{first\_entity, second\_entitiy}) =$$

-continued $$\frac{idf_{first\_entity}}{idf_{second\_entity}} \cdot \frac{co_{subpart}(first\_entity, second\_entity)}{occ_{subpart}(first\_entity)},$$

wherein $idf_{first\_entity}$ and $idf_{second\_entity}$ are inverse-document-frequency (IDF) values of the first and second entities, respectively, wherein $co_{subpart}$ (first_entity, second_entity) indicates a number of document subparts within which the first and second entities co-occur, and wherein $occ_{subpart}$(first_entity) indicates a number of document subparts within which the first entity occurs.

20. The system of claim 19, wherein a respective document subpart includes an individual sentence and/or an individual paragraph.

21. The system of claim 20, wherein calculating the similarity level involves determining sentence-based and/or paragraph-based co-occurrence frequencies of the semantic entities.

22. The system of claim 21, wherein the sentence-based co-occurrence frequency of the semantic entities is calculated based on a total number of sentences within which the semantic entities co-occur, and wherein the paragraph-based co-occurrence frequency of the semantic entities is calculated based on a total number of paragraphs within which the semantic entities co-occur.

\* \* \* \* \*